United States Patent
Choi

(10) Patent No.: US 9,155,038 B2
(45) Date of Patent: Oct. 6, 2015

(54) MOBILE NETWORK CONTROL APPARATUS AND ENERGY SAVING METHOD

(75) Inventor: Jin Hyeock Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 13/216,468

(22) Filed: Aug. 24, 2011

(65) Prior Publication Data

US 2012/0157002 A1 Jun. 21, 2012

(30) Foreign Application Priority Data

Dec. 21, 2010 (KR) .................. 10-2010-0131918

(51) Int. Cl.
*H04B 17/00* (2015.01)
*H04W 52/02* (2009.01)
*H04W 24/00* (2009.01)

(52) U.S. Cl.
CPC .......... *H04W 52/0206* (2013.01); *H04W 24/00* (2013.01); *Y02B 60/50* (2013.01)

(58) Field of Classification Search
CPC ..... H04W 24/00; H04W 52/02; H04W 40/00; H04W 36/00
USPC .............. 455/67.11, 522, 524, 444, 574, 572, 455/115.1
See application file for complete search history.

(56) References Cited

U.S. PATENT DOCUMENTS

| | | | | |
|---|---|---|---|---|
| 6,553,016 B1* | 4/2003 | Roxbergh | ..................... | 370/331 |
| 6,584,330 B1* | 6/2003 | Ruuska | ..................... | 455/574 |
| 7,239,619 B2* | 7/2007 | Tobe et al. | ..................... | 370/331 |
| 7,567,808 B2* | 7/2009 | Yeh | ..................... | 455/436 |
| 2002/0132621 A1* | 9/2002 | Takano et al. | ..................... | 455/435 |
| 2003/0045320 A1* | 3/2003 | Tanno et al. | ..................... | 455/522 |
| 2003/0214915 A1* | 11/2003 | Ishikawa | ..................... | 370/252 |
| 2004/0131029 A1* | 7/2004 | Tobe et al. | ..................... | 370/331 |
| 2005/0105483 A1* | 5/2005 | Uehara et al. | ..................... | 370/315 |
| 2006/0052105 A1* | 3/2006 | Yeh | ..................... | 455/436 |
| 2006/0111137 A1* | 5/2006 | Mori et al. | ..................... | 455/522 |
| 2007/0049211 A1* | 3/2007 | Rensburg et al. | ..................... | 455/69 |
| 2007/0253385 A1* | 11/2007 | Li et al. | ..................... | 370/338 |
| 2009/0023477 A1* | 1/2009 | Staudte | ..................... | 455/562.1 |
| 2009/0323663 A1* | 12/2009 | Nakatsugawa | ..................... | 370/343 |
| 2010/0015972 A1* | 1/2010 | Hong et al. | ..................... | 455/428 |
| 2010/0056160 A1* | 3/2010 | Kim et al. | ..................... | 455/444 |

(Continued)

FOREIGN PATENT DOCUMENTS

| | | |
|---|---|---|
| JP | 04-156116 | 5/1992 |
| JP | 10-145842 | 5/1998 |

(Continued)

*Primary Examiner* — Wesley Kim
*Assistant Examiner* — MD Talukder
(74) *Attorney, Agent, or Firm* — NSIP Law

(57) ABSTRACT

Provided are a mobile network control apparatus and energy saving method. The mobile network control apparatus for may calculate a first amount of total consumed power consumed by m base stations to provide a first cell as a coverage range, and a second amount of total consumed power consumed by n base stations to provide a second cell including the first cell as a coverage range. The mobile network control apparatus may save energy by initiating an operation of the n base stations on a high power mode, and by suspending an operation of a remaining base station excluding the n base stations if the first amount of total consumed power is greater than the second amount of total consumed power.

19 Claims, 5 Drawing Sheets

(56) References Cited

U.S. PATENT DOCUMENTS

| | | | |
|---|---|---|---|
| 2010/0137016 A1* | 6/2010 | Voyer | 455/522 |
| 2010/0240387 A1* | 9/2010 | Ezaki | 455/452.2 |
| 2011/0059748 A1* | 3/2011 | Taylor et al. | 455/456.1 |
| 2011/0059763 A1* | 3/2011 | Yoshiuchi et al. | 455/522 |
| 2011/0207500 A1* | 8/2011 | Nakamura et al. | 455/522 |
| 2012/0014274 A1* | 1/2012 | Muraoka et al. | 370/252 |
| 2012/0034947 A1* | 2/2012 | Hosono et al. | 455/522 |
| 2012/0051260 A1* | 3/2012 | Tamaki | 370/253 |
| 2012/0157002 A1* | 6/2012 | Choi | 455/67.11 |

FOREIGN PATENT DOCUMENTS

| | | | | |
|---|---|---|---|---|
| JP | 11-234739 | | 8/1999 | |
| JP | 2002-204478 | | 7/2002 | |
| JP | 2002204478 | * | 7/2002 | H04Q 7/38 |
| KR | 10-2007-0110147 | | 11/2007 | |
| KR | 10-2009-0021718 | | 3/2009 | |
| KR | 10-2010-0069445 | | 6/2010 | |

* cited by examiner

MOBILE NETWORK CONTROL APPARATUS AND ENERGY SAVING METHOD

CROSS-REFERENCE TO RELATED APPLICATION(S)

This application claims the benefit under 35 U.S.C. §119(a) of Korean Patent Application No. 10-2010-0131918, filed on Dec. 21, 2010, in the Korean Intellectual Property Office, the entire disclosure of which is incorporated herein by reference for all purposes.

BACKGROUND

1. Field

The following description relates to a mobile network control apparatus and method that may save energy by controlling an operation mode or operation of a base station based on an amount of consumed power.

2. Description of Related Art

A mobile network control apparatus may control a plurality of cells within a service area by initiating an operation of a plurality of base stations. Terminals located within the service area may access a base station to use a service.

For example, the mobile network control apparatus may initiate the operation of the plurality of the base stations, and accordingly may unnecessarily waste energy by maintaining the initiated operation. For example, a base station that has a cell in which a terminal is not located may not need to be operated, however, conventional mobile network control apparatuses may initiate the operation of the base station because the base station is included in the service area of the plurality of base stations.

SUMMARY

In one general aspect, there is provided a mobile network control apparatus for energy efficiency, the apparatus including a calculating unit to calculate a first amount of total consumed power consumed by m base stations that have a first cell as a coverage area, and to calculate a second amount of total consumed power consumed by n base stations that have a second cell including the first cell as a coverage area, and a processor to initiate an operation of the n base stations on a high power mode, and to suspend an operation of the remaining base stations excluding the n base stations, in response to the first amount of total consumed power being greater than the second amount of total consumed power.

The calculating unit may be further configured to calculate a first result value by multiplying an amount of consumed power that is used for data transmission per unit time in the remaining base stations of which operation is suspended, and an average traffic demand per unit time in terminals located in the first cell, and adding the multiplied result to a base power amount used for initiating an operation of the remaining base stations, and is further configured to calculate a second result value by multiplying an amount of consumed power that is used for data transmission per unit time in the n base stations of which operation is initiated, and an average traffic demand per unit time in the terminals located in the first cell, in response to a number of the terminals located in the first cell being greater than a predetermined number, and the processor may initiate an operation of the remaining base stations on a low power mode, in response to the first result value being less than the second result value.

The apparatus may further comprise a controller to determine one or more of the m base stations as the n base stations, wherein the calculating unit calculates the second amount of total consumed power by adding the amounts of consumed power that are used when the determined n base stations operate on the high power mode.

The calculating unit may calculate the second amount of total consumed power based on a consumed power amount that is used for data transmission per unit time in the n base stations under the high power mode, and based on an average traffic demand per unit time in terminals that are located in the second cell.

The calculating unit may calculate the first amount of total consumed power by adding the amounts of consumed power that are used when the m base stations operate on a low power mode.

The calculating unit may calculate the first amount of total consumed power based on an amount of consumed power that is used for data transmission per unit time in the m base stations under the low power mode, and based on an average traffic demand per unit time in terminals that are located in the first cell.

The apparatus may further comprise a location manager to manage locations of the m base stations and the n base stations, and to manage locations of terminals that are received from the m base stations or the n bases stations and that are associated with the first cell or the second cell.

The apparatus may further comprise a controller to determine the n base stations based on the locations of the m base stations, and based on locations of terminals within the coverage area of the m base stations.

In one general aspect, there is provided a mobile network control method for energy efficiency, the method including calculating a first amount of total consumed power consumed by m base stations that have a first cell as a coverage area, calculating a second amount of total consumed power consumed by n base stations that have a second cell including the first cell as a coverage area, and initiating an operation of the n base stations on a high power mode, and suspending an operation of the remaining base stations excluding the n base stations, in response to the first amount of total consumed power being greater than the second amount of total consumed power.

The method may further comprise, in response to a number of terminals located in the first cell being greater than a predetermined number, calculating a first result value by multiplying an amount of consumed power that is used for data transmission per unit time in the remaining base stations of which operation is suspended, and an average traffic demand per unit time in the terminals located in the first cell, and adding the multiplied result to a base power amount used for initiating an operation of the remaining base stations, calculating a second result value by multiplying an amount of consumed power that is used for data transmission per unit time in the n base stations of which operation is initiated, and an average traffic demand per unit time in the terminals located in the first cell, and initiating an operation of the remaining base stations on a low power mode, in response to the first result value being less than the second result value.

The calculating of the second amount of total consumed power may be based on an amount of consumed power that is used for data transmission per unit time in the n base stations under the high power mode, and based on an average traffic demand per unit time in terminals that are located in the second cell.

The calculating of the first amount of total consumed power may be based on an amount of consumed power that is used for data transmission per unit time in the m base stations under the low power mode, and based on an average traffic demand per unit time in terminals that are located in the first cell.

The method may further comprise managing locations of the m base stations and the n base stations, and managing locations of terminals that are received from the m base stations or the n bases stations that are associated with the first cell or the second cell.

The method may further comprise determining the n base stations based on the locations of the m base stations, and based on locations of terminals within the coverage area of the m base stations.

In another aspect, there is provided a mobile apparatus for power saving in a wireless communication environment, the apparatus including a calculating unit to calculate a first amount of power consumed by m base stations that operate in a lower power mode to provide a service area, and to calculate a second amount of power consumed by n base stations that operate in a higher power mode to provide the service area, wherein n is less than m, and a processor to activate the n base stations and to suspend the operation of the m base stations, in response to the second amount of power consumed being less than the first amount of power being consumed.

One or more of the m base stations may also be included in the n base stations.

The calculating unit may be further configured to calculate a third amount of power consumed by the n base stations after the m base stations have been suspended, and the calculating unit may be configured to calculate a fourth amount of power consumed by the n base stations and one or more of the suspended m base stations operating in the lower power mode.

If the fourth amount of power is less than the third amount of power, the processor may be further configured to activate the one or more suspended base stations to the lower power operating mode.

The mobile apparatus may further comprise a controller to verify the locations of the m base stations and the terminals served by the m base stations, and to determine the n base stations based on the locations of the m base stations and the terminals served by the m base stations.

Other features and aspects may be apparent from the following detailed description, the drawings, and the claims.

Figure 1:
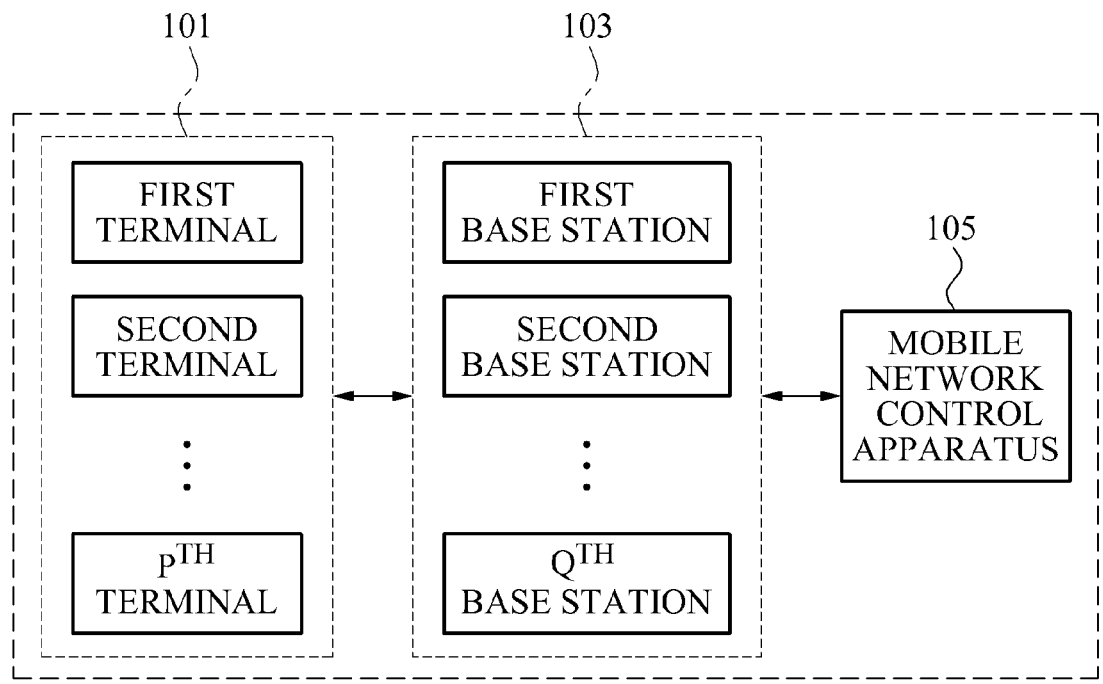
FIG. 1 is a diagram illustrating an example of a network that includes a mobile network control apparatus for energy efficiency.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of a network that includes a mobile network control apparatus for energy efficiency.

Referring to FIG. 1, the network includes a terminal 101, a base station 103, and a mobile network control apparatus 105. The mobile network control apparatus 105 may be or may be included in a terminal such as a mobile terminal, a server, a computer, and the like.

The terminal 101 may include a plurality of terminals. The terminal 101 may access a base station that is located within a relatively short distance from among a plurality of base stations in order to use a service. For example, the terminal 101 may obtain a location of the terminal 101 using a Global Positioning System (GPS) module. In response to the terminal 101 accessing the base station, the obtained location of the terminal 101 may be transmitted to the base station to be accessed.

The base station 103 may include a plurality of base stations, and may transfer the location of the terminal 101 that is received from the terminal 101 to the mobile network control apparatus 105 for energy efficiency.

The operation of the base station 103 may be initiated or suspended based on a control of the mobile network control apparatus 105 for energy efficiency. As described herein, initiating the operation of a base station corresponds to activating the base station or otherwise waking the base station up so that the base station may provide a service. For example, if the operation is initiated, the base station 103 may operate on a low power mode that includes a first transmission power to cover a first cell, or on a high power mode that includes a second transmission power to cover a second cell, based on the control of the mobile network control apparatus 105 for energy efficiency. In this example, the second cell coverage area is greater than the first cell coverage area.

As described herein, if a base station is operating in a higher power mode, the base station may provide a cell coverage that is greater in area than if the base station were operating in the lower power mode. Accordingly, n base stations acting in a higher power mode may provide a coverage area that is greater than a coverage area provided by m base stations acting in a lower power mode, even if the n base stations are less in number than the m base stations.

The mobile network control apparatus 105 for energy efficiency may initiate or suspend an operation of the base station 103. For example, the mobile network control apparatus 105 for energy efficiency may control the base station 103 to operate on the low power mode or on the high power mode.

As an example, in order to cover a service area, the mobile network control apparatus 105 for energy efficiency may compare a first amount of total consumed power used while m base stations operate on the low power mode, and a second amount of total consumed power used while n base stations operate on the high power mode. In this example, the mobile network control apparatus 105 may control an operation of the n base stations to be initiated on the high power mode, in response to the first amount of total consumed power being greater than the second amount of total consumed power. For example, m and n may be natural numbers. In this example, the mobile network control apparatus 105 for energy efficiency may control an operation of a remaining base station, excluding the n base stations, such that the remaining base stations are suspended.

The mobile network control apparatus 105 for energy efficiency may manage a location with respect to the base station 103, and/or a location of the terminal 101 transferred from the base stations 103 in association with the first cell or the second cell. Thus, the mobile network control apparatus 105 for energy efficiency may determine n base stations to operate on the high power mode from among the m base stations, based on locations with respect to the m base stations, and based on locations of terminals that are within a coverage of the m base stations.

In a case where an amount of total consumed power with respect to the base stations is reduced when operations of some remaining suspended base stations, covering a cell where terminals greater than a predetermined number are located, are switched to be initiated in a low power mode, the mobile network control apparatus 105 for energy efficiency may control the operations of some remaining base stations to be initiated in the low power mode, in a state that the n base stations are maintained in the high power mode.

As described in various examples, the mobile network control apparatus 105 for energy efficiency may save energy with respect to a mobile network operation, by controlling an operation mode or an operation of a base station, based on an amount of consumed power. For example, instead of allowing all base stations in a coverage area to operate in a high power mode for providing a service, the mobile network control apparatus 105 may control one or more of the bases stations to operate in a low power mode, or may suspend one or more base stations from acting in either the low power mode or the high power mode, thus conserving energy.

Figure 2:
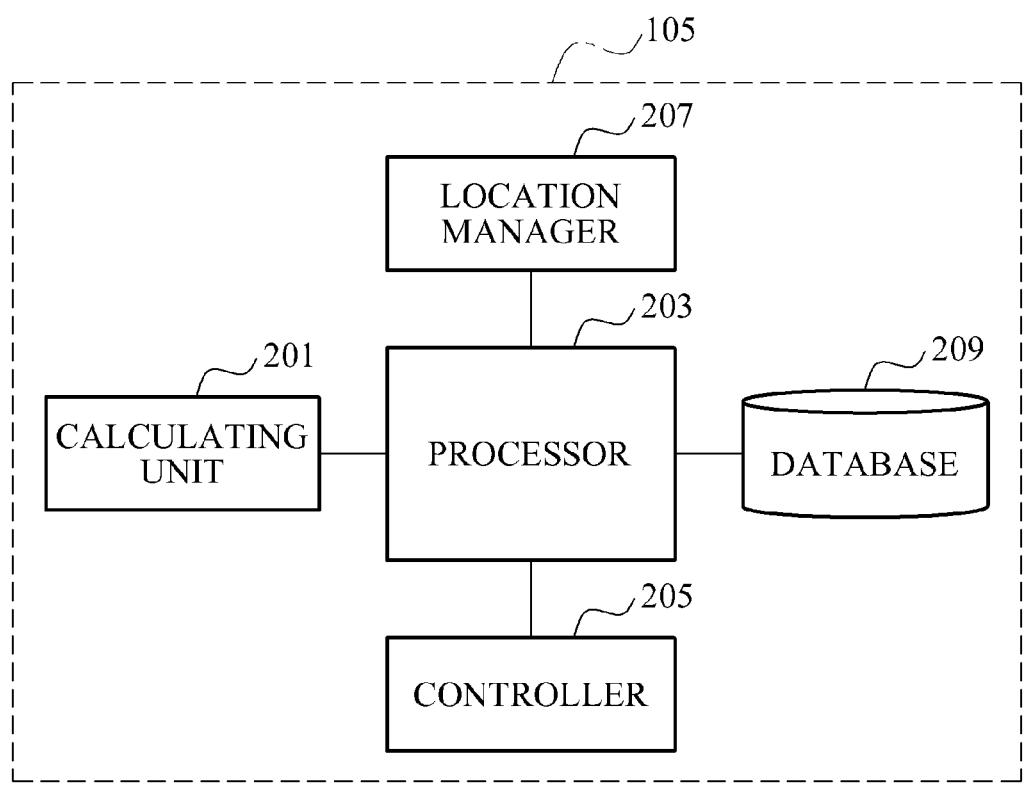
FIG. 2 is diagram illustrating an example of a mobile network control apparatus for energy efficiency.

FIG. 2 illustrates an example of a mobile network control apparatus for energy efficiency.

Referring to FIG. 2, mobile network control apparatus 105 for energy efficiency includes a calculating unit 201, a processor 203, a controller 205, a location manager 207, and a database 209.

The calculating unit 201 may calculate a first amount of total consumed power with respect to m base stations that have a first cell as a coverage range. The calculating unit 201 may calculate a second amount of total consumed power with respect to n base stations that have a second cell including the first cell as a coverage range.

A service area in which a service is available, may be set to include m first cells that the m base stations cover, or n second cells that the n base stations cover. If a range of an area associated with the second cell is greater than a range of an area associated with the first cell, the service area may be set to include n second cells, less than m first cells.

The calculating unit 201 may calculate the first amount of total consumed power by adding amounts of consumed power that are used while the m base stations operate on a low power mode, and may calculate the second amount of total consumed power by adding amounts of consumed power that are used while the n base stations operate on a high power mode.

For example, the calculating unit 201 may calculate the first amount of total consumed power $P_{total\_1}$, based on a consumed power amount $P'_{low}$ that is used for data transmission per unit time in the m base stations under the low power mode, and based on an average traffic demand $D_m$ per unit time in the terminals that are located in the first cell, which may be expressed by Equation 1.

$$P_{total\_1} = m*(P_{base} + P'_{low}*D_m*N_{ut})$$ [Equation 1]

In Equation 1, m indicates a number of base stations that may operate on a low power mode, $P_{base}$ indicates a base power amount that is used to initiate an operation of the base station, $N_{ut}$ indicates a number of terminals, and $P'_{low}$ corresponds to $P_{low}/R_k$. In this example, $P_{low}$ indicates a first amount of transmission power under low power mode and $R_k$ indicates an amount of data that is to be transmitted per unit time, for example, bits per second (bps).

For example, it may be assumed that the average traffic demand $D_m$ per unit time may be the same in all terminals, and the base power amount $P_{base}$ may be the same in all base stations.

The calculating unit 201 may calculate the second amount of total consumed power $P_{total\_2}$, based on an amount of consumed power $P'_{high}$ that is used for data transmission per unit time, in the n base stations under the high power mode, and based on an average traffic demand $D_m$ per unit time in the terminals that are located in the second cell, which may be expressed by Equation 2.

$$P_{total\_2} = n*(P_{base} + P'_{high}*D_m*N_{ut})$$ [Equation 2]

In Equation 2, n indicates a number of base stations that may operate on a high power mode, $P_{base}$ indicates a base power amount that is used to initiate an operation of the base station, $N_{ut}$ indicates a number of terminals, and $P'_{high}$ corresponds to $P_{high}/R_k$. In this example, $P_{high}$ indicates a second amount of transmission power that is greater than the first amount of transmission power, under high power mode, and $R_k$ indicates an amount of data that is to be transmitted per unit time.

The processor 203 may initiate an operation of the n base stations on a high power mode, and may suspend an operation of a remaining base station, excluding the n base stations, in response to the first amount of total consumed power being greater than the second amount total consumed power.

The calculating unit 201 may recalculate a total amount of consumed power with respect to a base station, in response to the suspended operation of the remaining base stations being initiated, and provide the recalculated amount of total consumed power to the processor 203. The calculating unit 201 may also calculate what the total amount of consumed power would if one or more suspended base stations were switched back to low power mode, in a state that at least base stations is operating on a high power mode.

If the total amount of power consumed will be reduced by switching one or more of the previously suspended base stations to a low power mode, the processor 203 may control one or more of the previously suspended base stations to switch from a suspended state to an active state in which the base station operates in low power mode.

For example, the calculating unit 201 may recalculate a first result value by adding a value obtained by multiplying an amount of consumed power used for data transmission per unit time in the remaining base stations of which operation has been suspended and an average traffic demand per unit time in terminals located in the first cell, and a base power amount used for initiating an operation of the remaining base station. The calculating unit 201 may recalculate a second result value by multiplying an amount of consumed power used for data transmission per unit time in the n base stations of which operation is initiated, and an average traffic demand per unit time in the terminals located in the first cell. In this example, the processor 203 may initiate an operation of the remaining base station, on a low power mode, if the first result value is less than the second result value. An example with respect to the above description is further described with reference to FIG. 4.

The controller 205 may determine one or more base stations from among the m base stations as the n base stations to be operated on a high power mode. The controller 250 may verify locations with respect to the m base stations, and locations of terminals within coverage associated with the m base stations, and may determine the n base stations, based on the locations of the m base stations and based on the locations of the terminals, with reference to the database 209.

The location manager 207 may manage locations with respect to the m base stations and the n base stations, and may manage locations of terminals that are received from the m base stations or the n base stations in association with the first cell or the second cell. The location manager 207 may record the locations with respect to the m base stations and the n base stations, and the locations of the terminals within the coverage associated with the base station, in the database 209. For example, the location manager 207 may manage locations of terminals in association with the remaining base station of which operation is suspended, excluding the n base stations from the m base stations, as well as locations with respect to the n base stations of which operation may be initiated on a high power mode.

The database 209 may store the locations with respect to the m base stations and the n base stations, and the locations of the terminals that are within the coverage area associated with the base stations. The database 209 may also store an amount of consumed power that is used for data transmission by the base station per unit time for each mode, for example, low power mode and high power mode, and an average traffic demand per unit time in the terminal.

Figure 3:
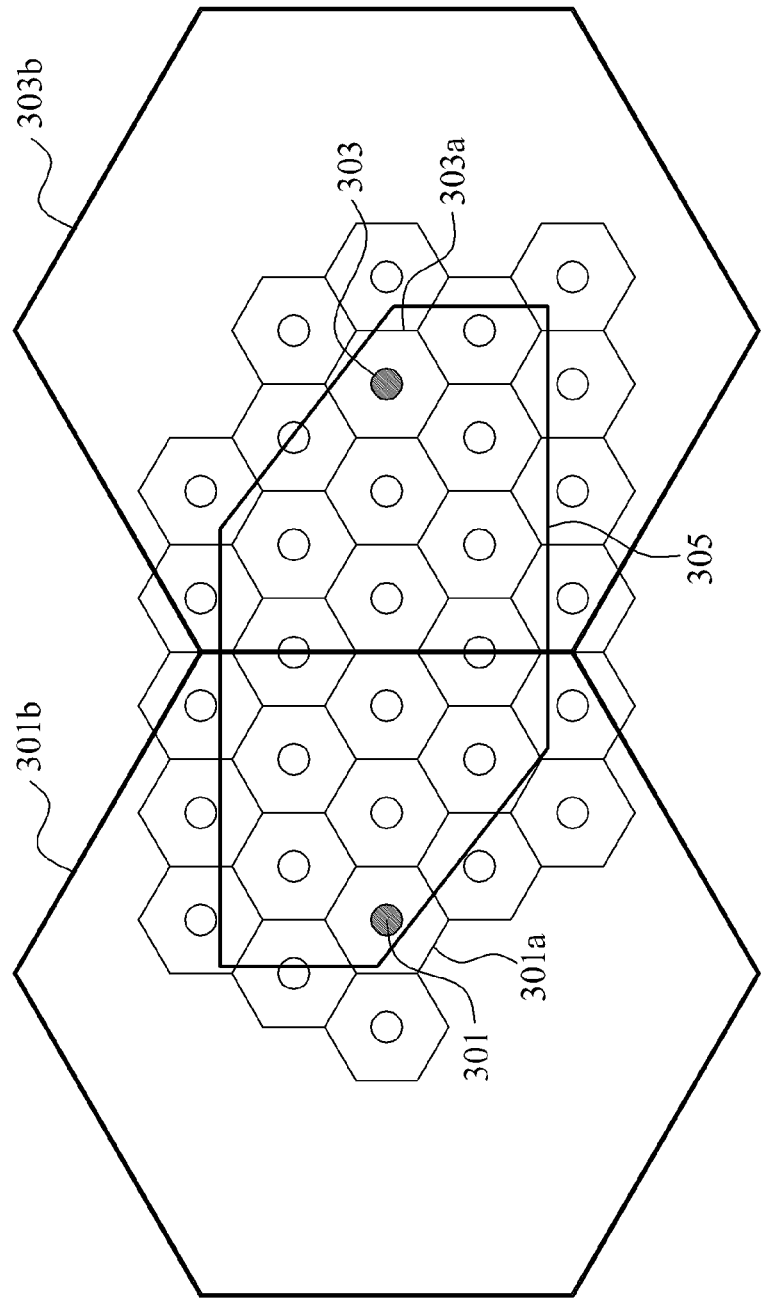
FIG. 3 is a diagram illustrating an example of a process for controlling a base station in association with a coverage range.

FIG. 3 illustrates an example of a process for controlling a base station in association with a coverage range.

Referring to FIG. 3, the mobile network control apparatus for energy efficiency may initiate or suspend an operation with respect to each of a plurality of base stations. For example, if the operation of the base stations is initiated, the mobile network control apparatus for energy efficiency may operate the base stations on a low power mode to generate a first cell as a range of coverage, or may operate the base stations on a high power mode to generate a second cell as a range of coverage.

For example, the mobile network control apparatus for energy efficiency may initiate the operation of a first base station 301 and a second base station 303 on a low power mode to generate a first cell_#1 301a of the first base station 301, and a first cell_#2 303a of the second base station 303. As another example, the apparatus may operate the first base station 301 and the second base station 303 on a high power mode to generate a second cell_#1 301b of the first base station 301, and a second cell_#2 303b of the second base station 303b.

The mobile network control apparatus for energy efficiency may control a base station based on total consumed power amounts with respect to a plurality of base stations. For example, in order to cover the service area 305, the mobile network control apparatus for energy efficiency may compare a first amount of total consumed power used while a plurality of base stations operate on a low power mode, and a second amount of total consumed power used while both the first base station 301 and the second base station 303 operate on a high power mode while the remaining base stations are suspended or are not consuming power.

The apparatus may control an operation of the two of the first base station 301 and the second base station 303, to be on a high power mode if the first amount of total consumed power is greater than the second amount of total consumed power. In this example, the mobile network control apparatus for energy efficiency may save energy by suspending the operation of the remaining base stations accept for the first base station 301 and the second base station 303.

Figure 4:
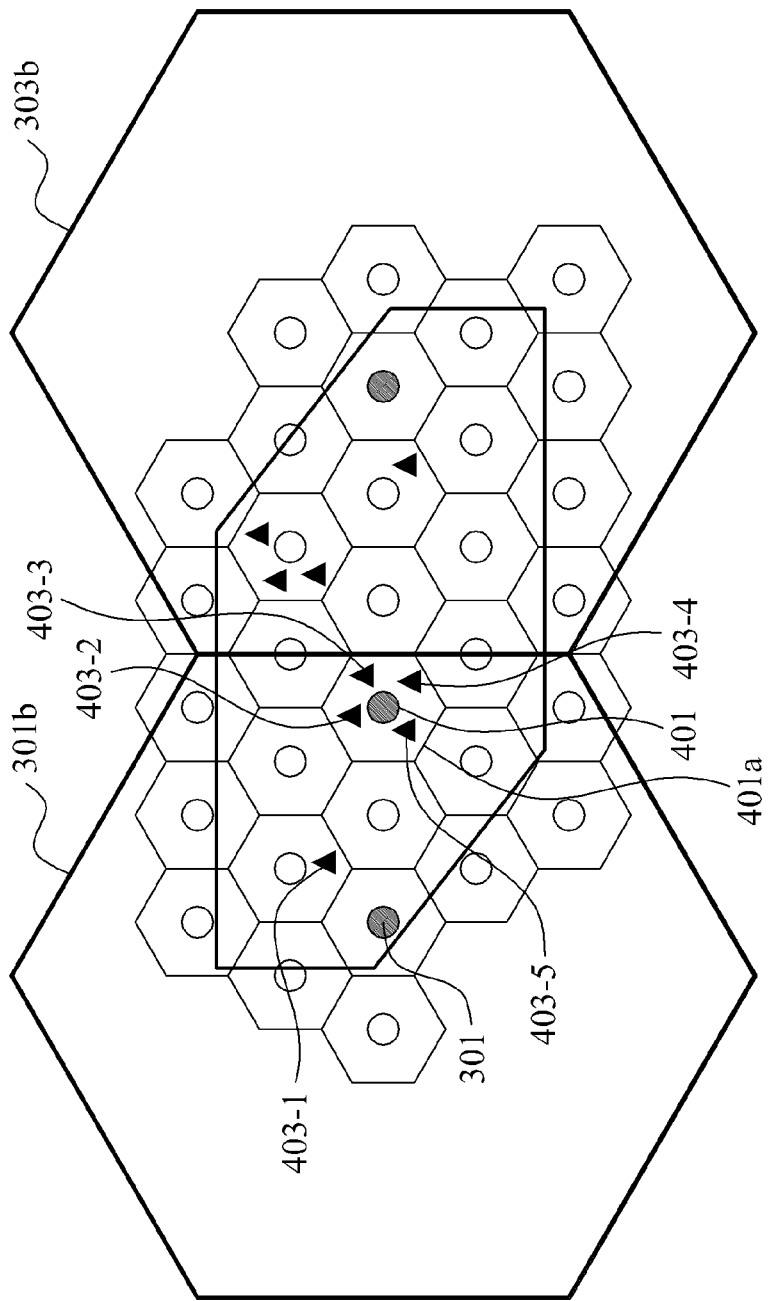
FIG. 4 is a diagram illustrating an example of a process for controlling a base station.

FIG. 4 illustrates an example of a process for controlling a base station.

Referring to FIG. 4, the mobile network control apparatus for energy efficiency may recalculate a total amount of consumed power with respect to a base station, at a point in time at which a suspended operation of the base stations has been initiated, in a state that at least base stations is operating on a high power mode. For example, the apparatus may control one or more base stations to switch from a suspended operation state to a low power mode, if the total amount of consumed power with respect to the base stations will be reduced by switching the one or more base stations.

For example, the apparatus may calculate the total amount of power consumed after suspending one or more base stations, in a state that at least base stations is operating on a high power mode. The apparatus may calculate the total amount of power that will be consumed if one or more suspended base stations were initiated (i.e. switched to a low power mode). If the total amount of power consumed will be reduced by initiating one or more of the previously suspended base stations to a low power mode, the apparatus may control the previously suspended base station to switch from a suspended state to a state in which the base station operates in low power mode.

For example, the mobile network control apparatus for energy efficiency may calculate a third amount of total consumed power in a state that an operation of the first base station 301 is on a high power mode, and the remaining base stations excluding the first base station 301 are suspended. In this example, the remaining base stations are a plurality of base stations associated with a second cell_#1 301b, corresponding to a range of a coverage with respect to the first base station 301. The apparatus may calculate a fourth amount of total consumed power in a state that an initiated operation of the first base station 301 is maintained on a high power mode, and an operation of a previously suspended base station such as the third base station 401, among the base stations of which operation is suspended, is initiated on a low power mode. In this example, the mobile network control apparatus for energy efficiency may determine to initiate the operation of the third base station 401, from among the base stations of which operation is suspended, using a number of terminals located in a coverage range with respect to the base stations.

For example, the apparatus may calculate the third amount of total consumed power $P_{total3}$ and the fourth amount of total consumed power $P_{total4}$, based on an average traffic demand per unit time in a first terminal 403-1 through a fifth terminal 403-5, which may be expressed by Equation 3 and Equation 4.

$$P_{total_3} = (P_{base} + P'_{high} * D_m * 5) \quad \text{[Equation 3]}$$
$$= (P_{base} + P'_{high} * D_m * 1) + (P'_{base} * D_m * 4)$$

$$P_{total4} = (P_{base} + P'_{high} * D_m * 1) + (P_{base} + P'_{low} * D_m * 4) \quad \text{[Equation 4]}$$

The mobile network control apparatus for energy efficiency may compare the third amount of total consumed power and the fourth amount of total consumed power, and may initiate an operation of the third base station 401 on a low power mode, in response to the fourth total consumed power amount being less than the third total consumed power amount.

Because the consumed power amount $P_{base}+P'_{high}*D_m*1$ of the first base station with respect to the first terminal 403-1 may be the same, the mobile network control apparatus for energy efficiency may compare a first result value $P_{base}+ P'_{low}*D_m*4$ that is obtained by adding a value obtained by multiplying a consumed power amount used for data transmission for unit time in the third base station 401, and an average traffic demand for time in the second terminal 403-2 through the fifth terminal 403-5, located in the first cell_#3 401a, corresponding to a coverage range with respect to the third base station 401, and a base power amount used to initiate an operation of the third base station 401, with a second result value, $P'_{high}*D_m*4$ that is obtained by multiplying a consumed power used for data transmission for unit time in the first base station 301, and an average traffic demand for time in the second terminal 403-2 through the fifth terminal 403-5, located in the second cell_#1 301b, corresponding to a coverage range with respect to the first base station 301.

The mobile network control apparatus for energy efficiency may initiate an operation, of the third base station 401 on a low power mode, in response to the first result value being less than the second result value.

The mobile network control apparatus for energy efficiency may periodically identify a traffic demand in a terminal, and may operate a mobile network using a minimum energy, by controlling an operation mode or an operation of the base station, based on a consumed power amount of the base station that is used to provide a service to the terminal.

Figure 5:
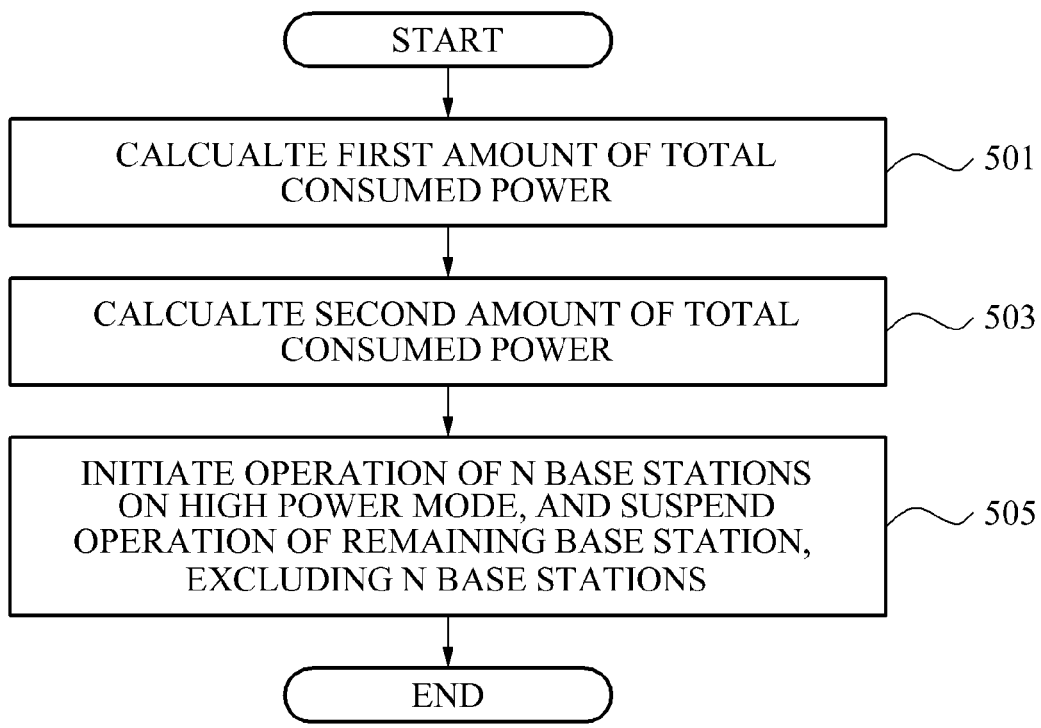
FIG. 5 is a flowchart illustrating an example of a mobile network control method for energy efficiency.

FIG. 5 illustrates an example of a mobile network control method for energy efficiency.

Referring to FIG. 5, the mobile network control apparatus for energy efficiency calculates a first total consumed power amount with respect to m base stations that have a first cell as a coverage range, in 501.

For example, the mobile network control apparatus for energy efficiency may calculate the first amount of total consumed power by adding consumed power amounts that are used when the m base stations operate on a low power mode. The mobile network control apparatus for energy efficiency may calculate the first amount of total consumed power, based on an amount of consumed power that is used for data transmission for unit of time in the m base stations under the low power mode, and based on an average traffic demand for time in the terminals located in the first cell.

In 503, the mobile network control apparatus for energy efficiency calculates a second amount of total consumed power, with respect to n base stations that have a second cell that includes the first cell as a coverage range.

The mobile network control apparatus for energy efficiency may determine one or more of the m base stations as the n base stations. In this example, the mobile network control apparatus for energy efficiency may manage locations with respect to the m base stations and the n base stations, may manage locations of terminals received from the m base stations or the n base stations in association with the first cell or the second cell, and may determine the n base stations based on the locations of the m base stations, and based on the locations of the terminals that are located in the coverage associated with the m base stations.

For example, the mobile network control apparatus for energy efficiency may calculate the second amount of total consumed power by adding the amounts of consumed power that are used when the determined n base stations operate on the high power mode. In this example, the mobile network control apparatus for energy efficiency may calculate the second amount of total consumed power based on an amount of consumed power that is used for data transmission for unit time in the n base stations under the high power mode, and based on an average traffic demand for unit time in the terminals that are located in the second cell.

In 505, the mobile network control apparatus for energy efficiency initiates operation of the n base stations, on a high power mode, in response to the first amount of total consumed power being greater than the second amount of total consumed power. Accordingly, the mobile network control apparatus for energy efficiency may save energy by suspending an operation of the remaining base stations excluding the n base stations.

The mobile network control apparatus for energy efficiency may recalculate a total amount of consumed power, with respect to a base station at a point in time at which the operation of the remaining base stations have been suspended, and may control one or more of the remaining base station to switch from the suspended state to an active state if the total amount of consumed power will be reduced by initiating the operation of the one or more remaining base stations.

For example, if a number of terminals located in the first cell is greater than a predetermined number, the mobile network control apparatus for energy efficiency may recalculate a first result value obtained by adding a value obtained by multiplying an amount of consumed power used for data transmission per unit time in the remaining base station of which operation is suspended, and an average traffic demand per unit time in the terminals located in the first cell, and a base power amount used for initiating an operation of the remaining base station. The apparatus may also calculate a second result value obtained by multiplying an amount of consumed power used for data transmission per unit time in the n base stations of which operation is initiated, and an average traffic demand per unit time in the terminals located in the first cell. The mobile network control apparatus for energy efficiency may compare the first result value and the second result value, and may initiate an operation of one or more of the remaining base stations on a low power mode, if the first result value is less than the second result value.

The mobile network control apparatus for energy efficiency may save energy by controlling an operation mode or an operation of a base station, based on a consumed power amount or a location of a terminal.

The mobile network control apparatus for energy efficiency may operate a mobile network with optimal energy efficiency per unit of time, by controlling a base station, based on an average traffic demand for time in a terminal.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile network control apparatus for energy efficiency, the apparatus comprising:
a calculating unit configured to calculate a first amount of total consumed power consumed by m base stations that have a first cell as a coverage area, and configured to calculate a second amount of total consumed power consumed by n base stations that have a second cell including the first cell as a coverage area, where n and m are natural numbers; and
a processor configured to initiate an operation of the n base stations on a high power mode, and to temporarily suspend an operation of remaining base stations excluding the n base stations, in response to the first amount of total consumed power being greater than the second amount of total consumed power,
wherein:
the calculating unit is further configured to calculate a first result value by multiplying an amount of consumed power that is used for data transmission per unit time in the remaining base stations of which operation is suspended, and an average traffic demand per unit time in terminals located in the first cell, and adding the multiplied result to a base power amount used for initiating an operation of the remaining base stations, and is further configured to calculate a second result value by multiplying an amount of consumed power that is used for data transmission per unit time in the n base stations of which operation is initiated, and an average traffic demand per unit time in the terminals located in the first cell, in response to a number of the terminals located in the first cell being greater than a predetermined number; and
the processor initiates an operation of the remaining base stations on a low power mode, in response to the first result value being less than the second result value.

2. The apparatus of claim 1, further comprising a controller configured to determine one or more of the m base stations as the n base stations,
wherein the calculating unit calculates the second amount of total consumed power by adding the amounts of consumed power that are used when the determined n base stations operate on the high power mode.

3. The apparatus of claim 2, wherein the calculating unit calculates the second amount of total consumed power based on a consumed power amount that is used for data transmission per unit time in the n base stations under the high power mode, and based on an average traffic demand per unit time in terminals that are located in the second cell.

4. The apparatus of claim 1, wherein the calculating unit calculates the first amount of total consumed power by adding the amounts of consumed power that are used when the m base stations operate on a low power mode.

5. The apparatus of claim 4, wherein the calculating unit calculates the first amount of total consumed power based on an amount of consumed power that is used for data transmission per unit time in the m base stations under the low power mode, and based on an average traffic demand per unit time in terminals that are located in the first cell.

6. The apparatus of claim 1, further comprising a location manager configured to manage locations of the m base stations and the n base stations, and configured to manage locations of terminals that are received from the m base stations or the n bases stations and that are associated with the first cell or the second cell.

7. The apparatus of claim 1, further comprising a controller configured to determine the n base stations based on the locations of the m base stations, and based on locations of terminals within the coverage area of the m base stations.

8. A mobile network control method for energy efficiency, the method comprising:
calculating a first amount of total consumed power consumed by m base stations that have a first cell as a coverage area;
calculating a second amount of total consumed power consumed by n base stations that have a second cell including the first cell as a coverage area, where n and m are natural numbers; and
initiating an operation of the n base stations on a high power mode, and temporarily suspending an operation of remaining base stations excluding the n base stations, in response to the first amount of total consumed power being greater than the second amount of total consumed power,
in response to a number of terminals located in the first cell being greater than a predetermined number:
calculating a first result value by multiplying an amount of consumed power that is used for data transmission per unit time in the remaining base stations of which operation is suspended, and an average traffic demand per unit time in the terminals located in the first cell, and adding the multiplied result to a base power amount used for initiating an operation of the remaining base stations;

calculating a second result value by multiplying an amount of consumed power that is used for data transmission per unit time in the n base stations of which operation is initiated, and an average traffic demand per unit time in the terminals located in the first cell; and initiating an operation of the remaining base stations on a low power mode, in response to the first result value being less than the second result value.

9. The method of claim 8, wherein the calculating of the second amount of total consumed power is based on an amount of consumed power that is used for data transmission per unit time in the n base stations under the high power mode, and based on an average traffic demand per unit time in terminals that are located in the second cell.

10. The method of claim 8, wherein the calculating of the first amount of total consumed power is based on an amount of consumed power that is used for data transmission per unit time in the m base stations under the low power mode, and based on an average traffic demand per unit time in terminals that are located in the first cell.

11. The method of claim 8, further comprising:
managing locations of the m base stations and the n base stations; and
managing locations of terminals that are received from the m base stations or the n bases stations that are associated with the first cell or the second cell.

12. The method of claim 8, further comprising determining the n base stations based on the locations of the m base stations, and based on locations of terminals within the coverage area of the m base stations.

13. A mobile apparatus for power saving in a wireless communication environment, the apparatus comprising:
a calculating unit configured to calculate a first amount of power consumed by m base stations that operate in a lower power mode to provide a service area, and configured to calculate a second amount of power consumed by n base stations that operate in a higher power mode to provide the service area, wherein n and m are natural numbers and n is less than m; and
a processor configured to activate the n base stations and to temporarily suspend the operation of the m base stations, in response to the second amount of power consumed being less than the first amount of power being consumed,
wherein:
the calculating unit is further configured to calculate a first result value by multiplying an amount of consumed power that is used for data transmission per unit time in the remaining base stations of which operation is suspended, and an average traffic demand per unit time in terminals located in the first cell, and adding the multiplied result to a base power amount used for initiating an operation of the remaining base stations, and is further configured to calculate a second result value by multiplying an amount of consumed power that is used for data transmission per unit time in the it base stations of which operation is initiated, and an average traffic demand per unit time in the terminals located in the first cell, in response to a number of the terminals located in the first cell being greater than a predetermined number; and
the processor initiates an operation of the remaining base stations on a low power mode, in response to the first result value being less than the second result value.

14. The mobile apparatus of claim 13, wherein one or more of the m base stations are also included in the n base stations.

15. The mobile apparatus of claim 13, wherein the calculating unit is further configured to calculate a third amount of power consumed by the n base stations after the m base stations have been suspended, and the calculating unit is configured to calculate a fourth amount of power consumed by the n base stations and one or more of the suspended m base stations operating in the lower power mode.

16. The mobile apparatus of claim 15, wherein if the fourth amount of power is less than the third amount of power, the processor is further configured to activate the one or more suspended base stations to the lower power operating mode.

17. The mobile apparatus of claim 13, further comprising a controller configured to verify the locations of the m base stations and the terminals served by the m base stations, and configured to determine the n base stations based on the locations of the m base stations and the terminals served by the m base stations.

18. The apparatus of claim 1, wherein the calculating unit:
calculates the first amount of total consumed power based on an amount of power that is consumed by the m base stations to transmit data to terminals in the first cell under low power mode and based on an average amount of traffic demand within the first cell, and
calculates the second amount of total consumed power based on an amount of power that is consumed by the n base stations to transmit data to terminals in the second cell under high power mode and based on an average amount of traffic demand within the second cell.

19. The apparatus of claim 1, wherein the calculating unit recalculates a total amount of consumed power with respect to a base station, in response to the suspended operation of the remaining base stations being initiated, and provides the recalculated amount of total consumed power to the processor.

* * * * *